US008307445B2

(12) United States Patent
Noda et al.

(10) Patent No.: US 8,307,445 B2
(45) Date of Patent: Nov. 6, 2012

(54) ANTI-WORM PROGRAM, ANTI-WORM APPARATUS, AND ANTI-WORM METHOD

(75) Inventors: Bintatsu Noda, Kawasaki (JP);
Kazumasa Omote, Kawasaki (JP);
Yoshiki Higashikado, Kawasaki (JP);
Masahiro Komura, Kawasaki (JP);
Masashi Mitomo, Kawasaki (JP);
Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1093 days.

(21) Appl. No.: 12/168,281

(22) Filed: Jul. 7, 2008

(65) Prior Publication Data

US 2008/0271148 A1 Oct. 30, 2008

Related U.S. Application Data

(63) Continuation of application No. PCT/JP2006/302125, filed on Feb. 8, 2006.

(51) Int. Cl.
*H04L 29/06* (2006.01)
(52) U.S. Cl. ............................................ 726/25; 726/22
(58) Field of Classification Search ................ 726/22–25
See application file for complete search history.

(56) References Cited

U.S. PATENT DOCUMENTS

| 7,814,542 B1* | 10/2010 | Day ................................. 726/22 |
| 2006/0230456 A1* | 10/2006 | Nagabhushan et al. ........ 726/25 |

FOREIGN PATENT DOCUMENTS

| JP | 2005-005836 | 1/2005 |
| JP | 2005-252808 | 9/2005 |

OTHER PUBLICATIONS

Japanese Office Action issued Aug. 17, 2010 in corresponding Japanese Office Action 2007-557697.
International Search Report dated Mar. 13, 2006 in corresponding International Application No. PCT/JP2006/302125 ( 10 pp including translation).
English Translation of the International Preliminary Report on Patentability issued Aug. 12, 2008 in corresponding International Patent Application PCT/JP2006/302126.

* cited by examiner

*Primary Examiner* — Edward Zee
(74) *Attorney, Agent, or Firm* — Staas & Halsey LLP

(57) ABSTRACT

An anti-worm program allows a computer to execute control of communication suspected as worm communication, the program allowing the computer to execute: a communication information acquisition step that acquires communication information which is information concerning communication from a target source; and a communication control step that has a control amount calculation formula for calculating the control amount of the communication from the target source using the communication information and performs control of the communication from the target source based on the communication control amount obtained using the control amount calculation formula.

12 Claims, 2 Drawing Sheets

ANTI-WORM PROGRAM, ANTI-WORM APPARATUS, AND ANTI-WORM METHOD

TECHNICAL FIELD

This application is a continuation application, filed under 35 U.S.C. §111(a), of International Application No. PCT/JP2006/302125, filed Feb. 8, 2006, the disclosure of which is herein incorporated in its entirety by reference. The present invention relates to an anti-worm program, an anti-worm apparatus, and an anti-worm method for coping with worm attacks.

BACKGROUND ART

"Worm" is a collective term of programs that repeatedly perform an infecting action for a vulnerable host computer on a network to bring the network to a halt. Conventionally, whether or not communication is performed by a worm has been determined by binary values. Accordingly, the number of responses for the determination result is two.

As a conventional art relating to the present invention, there is known a technique that detects a worm based on a threshold value with respect to the number of packet destinations during a predetermined monitoring period so as to detect an unknown worm in an early stage (refer to, e.g., Patent Document 1).

Patent Document 1: Jpn. Pat. Appln. Laid-Open Publication No. 2005-134974

DISCLOSURE OF THE INVENTION

Problems to be Solved by the Invention

However, if an erroneous determination is made on whether or not communication is performed by a worm, an erroneous response is taken and thereby the following problem arises. For example, in the case where worm communication is erroneously determined as normal communication, the worm spreads over a network. Conversely, in the case where normal communication is erroneously determined as worm communication, the normal communication is disabled, obstructing business activities.

The present invention has been made to solve the above problem, and an object thereof is to provide an anti-worm program, an anti-worm apparatus, and an anti-worm method for preventing an erroneous response taken based on the binary determination of whether or not communication is performed by a worm.

Means for Solving the Problems

To solve the above problem, according to the present invention, there is provided an anti-worm program allowing a computer to execute control of communication suspected as worm communication, the program allowing the computer to execute: a communication information acquisition step that acquires communication information which is information concerning communication from a target source; and a communication control step that has a control amount calculation formula for calculating the control amount of the communication from the target source using the communication information and performs control of the communication from the target source based on the communication control amount obtained using the control amount calculation formula.

In the anti-worm program according to the present invention, the control amount indicates the restriction on the communication from the target source, and the communication control step performs control of the communication from the target source based on the restriction amount.

The anti-worm program according to the present invention further allows the computer to execute, before the statistical data acquisition step, a control amount calculation formula generation step that generates a control amount calculation formula for calculating the control amount of the communication from the target source from the communication information based on previously acquired statistical data obtained using communication information at normal communication time and communication information at worm communication time.

In the anti-worm program according to the present invention, the statistical data indicates the distribution of the number of destination addresses transmitted per unit time from the target source both in the normal communication and worm communication.

In the anti-worm program according to the present invention, the control amount changes in accordance with a change of the communication information in a stepwise or continuous manner in the control amount calculation formula.

In the anti-worm program according to the present invention, the communication information is the number of destination addresses transmitted per unit time from the target source.

According to the present invention, there is provided an anti-worm apparatus that performs control of communication suspected as worm communication, comprising: a communication information acquisition section that acquires communication information which is information concerning communication from a target source; and a communication control section that has a control amount calculation formula for calculating the control amount of the communication from the target source using the communication information and performs control of the communication from the target source based on the communication control amount obtained using the control amount calculation formula.

In the anti-worm apparatus according to the present invention, the control amount indicates the restriction on the communication from the target source, and the communication control section performs control of the communication from the target source based on the restriction amount.

The anti-worm apparatus according to the present invention further comprises a control amount calculation formula generation step that generates a control amount calculation formula for calculating the control amount of the communication from the target source from the communication information based on previously acquired statistical data obtained using communication information at normal communication time and communication information at worm communication time.

In the anti-worm apparatus according to the present invention, the statistical data indicates the distribution of the number of destination addresses transmitted per unit time from the target source both in the normal communication and worm communication.

In the anti-worm apparatus according to the present invention, the control amount changes in accordance with a change of the communication information in a stepwise or continuous manner in the control amount calculation formula.

In the anti-worm apparatus according to the present invention, the communication information is the number of destination addresses transmitted per unit time from the target source.

According to the present invention, there is provided an anti-worm method that performs control of communication suspected as worm communication, comprising: a communication information acquisition step that acquires communication information which is information concerning communication from a target source; and a communication control step that has a control amount calculation formula for calculating the control amount of the communication from the target source using the communication information and performs control of the communication from the target source based on the communication control amount obtained using the control amount calculation formula.

BEST MODE FOR CARRYING OUT THE INVENTION

An embodiment of the present invention will be described below with reference to the accompanying drawings.

First, the configuration of an anti-worm apparatus according to the embodiment will be described.

Figure 1:
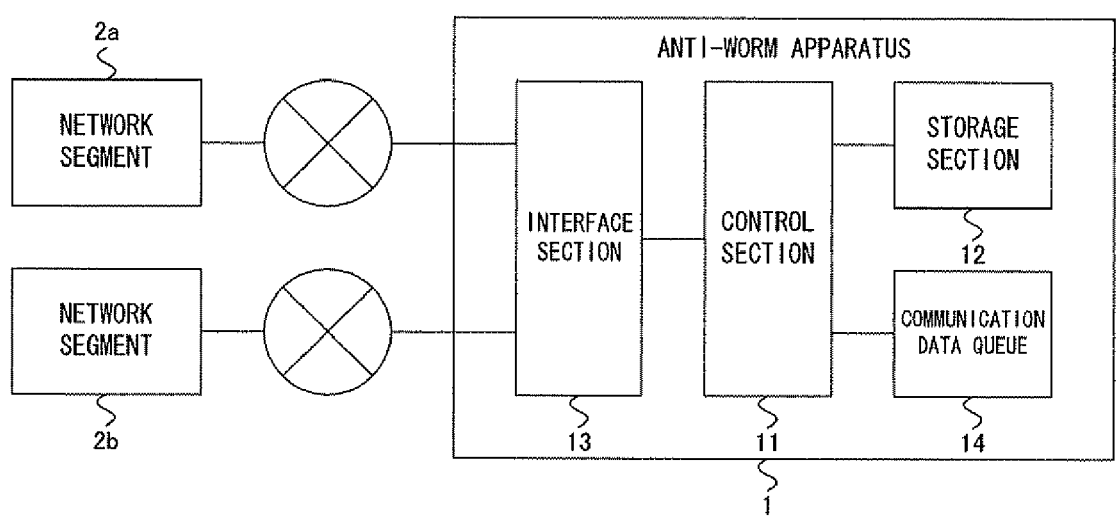
FIG. 1 is a block diagram showing an example of a configuration of an anti-worm apparatus according to an embodiment of the present invention.

FIG. 1 a block diagram showing an example of a configuration of the anti-worm apparatus according to the embodiment. An anti-worm apparatus 1 includes a control section 11, a storage section 12, an interface section 13, and a communication data queue 14. The anti-worm apparatus 1 is provided at the gateway of network segments 2a and 2b and is configured to detect worm communication and perform gradual shut-down or gradual recovery of communication. The network segments 2a and 2b each denote a closed network environment and each correspond to an intranet or one computer. The interface section 13 is connected to the network segments 2a and 2b via a network. The control section 11 relays communication between the network segments 2a and 2b via the interface section 13. Communication data between the network segments 2a and 2b is once stored in the communication data queue 14. Further, the control section 11 performs control amount calculation processing or communication control processing to be described later based on setting data stored in the storage section 12.

Next, control amount calculation formula generation processing performed by the anti-worm apparatus 1 will be described.

In the control amount calculation formula generation processing, the control section 11 previously collects communication log data indicative of normal communication and communication log indicative of worm communication where the worm is programmed to run (or unsolicited worm runs), calculates communication information from the communication log data, and calculates statistical data from the collected communication information. The acquisition of the communication information can be achieved by using the technique disclosed in, e.g., Patent Document 1.

Concretely, the control section 11 collects the communication log data of a target network during a certain period of time. The communication log data includes entries for each packet. Each entry includes data concerning communication, such as source/destination address, source/destination port, and protocol.

Then, the control section 11 classifies the entries included in the communication log data into categories according to the communication content. Concretely, the category classification can be made based on the features of each packet such as protocol (TCP, UDP, ICMP), service (destination port number, etc.), various kinds of flags included in a packet (only SYS packet in the case of TCP, etc.), and the like. This classification is performed based on the characteristics of the worm that the worm does not perform various types of communications in a random manner but similar worms perform a large number communications which are sorted into a similar category.

The control section 11 then calculates a worm detection parameter value per a predetermined unit time for each category-classified entry and defines the calculated value as communication information. The worm detection parameter is defined as data that greatly changes, as compared to the normal time, when the worm spreads over a network. The worm detection parameter is, e.g., the number of packets (the number of entries included in the communication log data), communication amount (data transfer amount per unit time), number of destination address or number of source addresses. The parameter may be used singularly or in a combination form. All the entries may be processed one by one without performing category classification.

The control section 11 calculates the appearance frequency of the communication information value for each predetermined range in units of a predetermined network segment, creates frequency distribution thereof, and uses the created frequency distribution as statistical data. In the present embodiment, the control section 11 extracts the entries having the same source address from those generated within a unit time and performs the appearance frequency calculation for the extracted entries.

While the technique disclosed in Patent Document 1 calculates a threshold value for the binary determination based on the abovementioned statistical data, the anti-worm apparatus 1 of the present embodiment calculates a risk calculation formula for calculating a risk value indicating whether or not a target is infected by the worm and a control amount calculation formula for calculating the control amount required for communication control based on the above statistical data.

In the present embodiment, a formula that calculates a risk value indicating whether or not a target is infected by the worm based on the number of communication partner's IP addresses per unit time will be described as a concrete example of the risk calculation formula. Here, the number of destination IP addresses that a target PC (Personal Computer) transmits per one second is assumed to be N (N is integer equal to or more than 0), and risk value indicating whether or not the target PC is infected by the worm is assumed to be R (R is real number between 0 and 1). "R=0" indicates that the target PC is absolutely free from the worm and "R=1" indicates that the target PC is absolutely infected by the worm.

The anti-worm apparatus 1 acquires, as the statistical data, the frequency distribution of N both in normal communication and worm communication which has previously been performed and generates, based on the statistical data, a risk calculation formula for calculating R from N. For example, to obtain the risk calculation formula, the anti-worm apparatus 1 calculates, from the frequency distribution of N, a value of N satisfying R=0 and value satisfying R=1. In the range of values of N satisfying 0<R<1, the anti-worm apparatus 1 generates an approximation formula of R with respect to N. An example of the generated risk calculation formulas are shown below.

| | |
|---|---|
| When N <= 100 | R = 0 |
| When 100 < N <= 150 | R = (N-100)^2/5000 |
| When 150 < N <= 200 | R = 1-(200-N)^2/5000 |
| When 200 < N | R = 1 |

Although the PC is set as a target here, a plurality of nodes, such as network segments, whose source IP addresses in the communication log data are included in a predetermined range may be set as a target.

Further, as the control amount for the communication control processing, communication permission rate with respect to the target computer is assumed to P (P is real number between 0 and 1). "P=0" indicates that communication to the target PC is perfectly shut-down and "P=1" indicates that communication to the target PC is perfectly permitted. The anti-worm apparatus 1 uses the risk calculation formula to generate the control amount calculation formula for calculating P from N. An example of the control amount calculation formula is shown below.

$$P=1-R$$

The control amount P may be changed in a stepwise manner in accordance with a change of N or may be changed in a continuous manner in accordance with a change of N.

The communication control processing performed by the anti-worm apparatus 1 will next be described.

Figure 2:
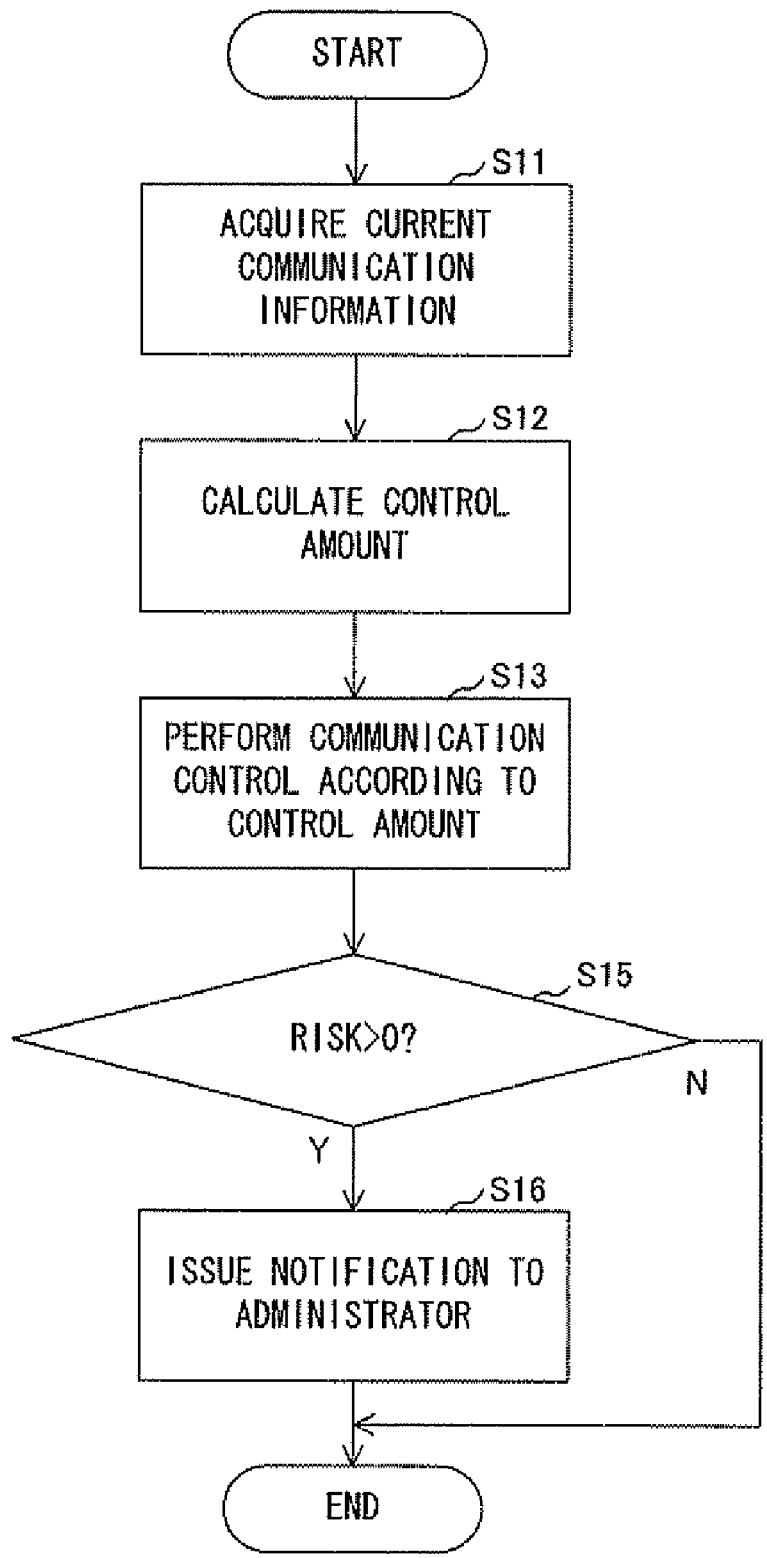
FIG. 2 is a flowchart showing an example of operation of communication control processing according to the embodiment of the present invention.

FIG. 2 is a flowchart showing an example of operation of the communication control processing performed by the anti-worm apparatus according to the embodiment. The control section 11 acquires the abovementioned communication information from the current communication log data (S11). The communication information in the present embodiment is the number N of destination addresses that the target PC has transmitted per unit time. Then, the control section 11 calculates the risk indicating whether or not the target PC is infected by the worm (S12). Here, the control section 11 calculates risk R and control amount P from N using the abovementioned control amount calculation formula.

The control section 11 then performs communication control according to the calculated control amount (S13). Here, the control section 11 restricts the communication amount per unit time according to the abovementioned communication permission rate P. The control section 11 then determines whether or not risk R>0 is satisfied (S15). When it is determined that there is no risk at all (N in S15), this flow is ended. On the other hand, when it is determined that there is even a little risk (Y in S15), the control section 11 notifies an administrator of the risk or the result of the communication control (S16), and this flow is ended. The control section 11 repeats this flow.

During the repetition of the flow of the communication control processing, when the risk of being infected by the worm is increased, the communication amount is reduced; while when the risk is reduced, the communication amount is increased. Although the anti-worm apparatus 1 performs the communication control to restrict the communication amount per unit time in the present embodiment, it may restrict the source, destination, or communicable port.

As described above, the anti-worm apparatus 1 does not perform the conventional binary determination of whether or not communication is performed by a worm, but calculates the risk or control amount based on the statistical data that has previously been created and current communication information and performs communication control based on the control amount, thereby preventing an erroneous response taken based on the erroneous binary determination. Further, the anti-worm apparatus 1 calculates the control amount from the number of destinations per unit time, that is, the control amount can easily be acquired from the communication log data.

The anti-worm apparatus according to the present embodiment can easily be applied to a network relay device to thereby increase the performance thereof. Examples of the network relay device include, e.g., a proxy server, a router, and a bridge.

Further, it is possible to provide a program that allows a computer constituting the anti-worm apparatus to execute the above steps as an anti-worm program. By storing the above program in a computer-readable storage medium, it is possible to allow the computer constituting the anti-worm apparatus to execute the program. The computer-readable storage medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

A communication information acquisition step corresponds to S11 of the communication control processing in the embodiment A communication control step corresponds to S12 to S16 of the communication control processing in the embodiment. A control amount calculation formula generation step corresponds to the control amount calculation formula generation processing in the embodiment. A communication information acquisition section, a communication control section, and a control amount calculation formula generation section correspond to the control section in the embodiment.

INDUSTRIAL APPLICABILITY

As described above, according to the present invention, it is possible to prevent an erroneous response taken based on the binary determination of whether or not communication is performed by a worm, as well as to flexibly perform communication control in accordance with the level of the worm risk.

The invention claimed is:

1. A non-transitory computer-readable storage medium having stored therein an anti-worm program causing a computer to execute a process comprising:

a acquiring communication information which is information concerning communication from a target source;

generating a control amount calculation formula that, based on a statistical data using a previously acquired communication information at worm communication time and a communication information at communication time other than the worm communication, the statistical data including distribution of the number of destination addresses transmitted per unit time from a predetermined source both in the worm communication and the communication other than the worm communication, generates a risk calculation formula which calculates a risk value whether the source is infected by the worm using the distribution of the destination addresses and generates a control amount calculation formula for calculating the control amount of the communication from the target source from the communication information using the risk calculation formula; and controlling the communication from the target source based on the communication control amount obtained using the control amount calculation formula.

2. The non-transitory computer-readable storage medium according to claim 1, wherein the control amount indicates the restriction on the communication from the target source, and the communication control step performs control of the communication from the target source based on the restriction amount.

3. The non-transitory computer-readable storage medium according to claim 1, wherein in the control amount calculation formula, the control amount changes in accordance with a change of the communication information in a stepwise or continuous manner.

4. The non-transitory computer-readable storage medium according to claim 1, wherein the communication information is the number of destination addresses transmitted per unit time from the target source.

5. An anti-worm apparatus that performs control of communication suspected as worm communication, comprising:

a communication information acquisition section that acquires communication information which is information concerning communication from a target source;

a control amount calculation formula generation section that, based on a statistical data using a previously acquired communication information at worm communication time and a communication information at communication time other than the worm communication, the statistical data including distribution of the number of destination addresses transmitted per unit time from a predetermined source both in the worm communication and the communication other than the worm communication, generates a risk calculation formula which calculates a risk value whether the source is infected by the worm using the distribution of the destination addresses and generates a control amount calculation formula for calculating the control amount of the communication from the target source from the communication information using the risk calculation formula; and a communication control section that performs control of the communication from the target source based on the communication control amount obtained using the control amount calculation formula.

6. The anti-worm apparatus according to claim 5, wherein the control amount indicates the restriction on the communication from the target source, and the communication control section performs control of the communication from the target source based on the restriction amount.

7. The anti-worm apparatus according to claim 5, wherein in the control amount calculation formula, the control amount changes in accordance with a change of the communication information in a stepwise or continuous manner.

8. The anti-worm apparatus according to claim 5, wherein the communication information is the number of destination addresses transmitted per unit time from the target source.

9. An anti-worm method that performs control of communication suspected as worm communication, comprising:

acquiring communication information which is information concerning communication from a target source;

generating, by a computer, a control amount calculation formula that, based on a statistical data using a previously acquired communication information at worm communication time and a communication information at communication time other than the worm communication, the statistical data including distribution of the number of destination addresses transmitted per unit time from a predetermined source both in the worm communication and the communication other than the worm communication, generates a risk calculation formula which calculates a risk value whether the source is infected by the worm using the distribution of the destination addresses and generates a control amount calculation formula for calculating the control amount of the communication from the target source from the communication information using the risk calculation formula; and controlling the communication from the target source based on the communication control amount obtained using the control amount calculation formula.

10. The anti-worm method according to claim 9, wherein the control amount indicates the restriction on the communication from the target source, and controlling communication from the target source based on the restriction amount.

11. The anti-worm method according to claim 9, wherein in the control amount calculation formula, the control amount changes in accordance with a change of the communication information in a stepwise or continuous manner.

12. The anti-worm method according to claim 9, wherein the communication information is the number of destination addresses transmitted per unit time from the target source.

* * * * *

UNITED STATES PATENT AND TRADEMARK OFFICE
CERTIFICATE OF CORRECTION

PATENT NO. : 8,307,445 B2
APPLICATION NO. : 12/168281
DATED : November 6, 2012
INVENTOR(S) : Bintatsu Noda et al.

Page 1 of 1

It is certified that error appears in the above-identified patent and that said Letters Patent is hereby corrected as shown below:

Column 6, Line 47, In Claim 1, delete "a acquiring" and insert -- acquiring --, therefor.

Signed and Sealed this
Twenty-ninth Day of January, 2013

David J. Kappos
*Director of the United States Patent and Trademark Office*